United States Patent [19]
Knight

[11] 4,193,643
[45] Mar. 18, 1980

[54] ANTI-SKID VEHICLE BRAKING SYSTEMS

[75] Inventor: Frederick J. Knight, Leamington Spa, England

[73] Assignee: Girling Limited, Birmingham, England

[21] Appl. No.: 924,298

[22] Filed: Jul. 13, 1978

[30] Foreign Application Priority Data
Jul. 13, 1977 [GB] United Kingdom ............ 29335/77

[51] Int. Cl.² .............................................. B60T 8/02
[52] U.S. Cl. ...................................... 303/118; 303/40
[58] Field of Search .................... 188/181 A; 303/113, 303/115, 118, 119, 40

[56] References Cited
U.S. PATENT DOCUMENTS

| | | | |
|---|---|---|---|
| 3,857,614 | 12/1974 | Kurichh | 303/118 |
| 3,929,383 | 12/1975 | Urban et al. | 303/118 |
| 3,941,428 | 3/1976 | Rothwell et al. | 303/118 |
| 3,950,035 | 4/1976 | Tribe | 303/118 |

Primary Examiner—Duane A. Reger
Attorney, Agent, or Firm—Scrivener, Parker, Scrivener & Clarke

[57] ABSTRACT

In a fluid-pressure operated anti-skid braking system operation of a control valve is controlled by a force of which the magnitude is determined by utilization of the pressure in a memory chamber defined between a pair of relatively movable spaced pistons. The piston carries a head which forms part of the valve, and the other piston is exposed to an operator-controlled pressure from an inlet passage.

7 Claims, 6 Drawing Figures

ANTI-SKID VEHICLE BRAKING SYSTEMS

SPECIFIC DESCRIPTION

This invention relates to improvements in fluid-pressure operated anti-skid braking systems for vehicles of the kind in which operating fluid from a supply for actuating a wheel brake is supplied to the brake through fluid-flow control valve means interposed in the line between the supply and the brake, and deceleration responsive means responsive to a skid signal are incorporated for operating the valve means to relieve the brake pressure of the fluid supplied to the brake at a skid point when the deceleration of the wheel is excessive and exceeds a predetermined value, a memory chamber being incorporated for storing a memory pressure dependant upon the brake pressure occurring at the skid point to provide a datum or changeover point between first and second successive stages of brake-reapplication, the first stage comprising the re-application of the operating fluid from the supply until an intermediate pressure less than the pressure at the skid point is attained at the changeover point, and the second stage comprising the continued re-application of the supply of operating fluid at a reduced rate of pressure increase.

In known anti-skid braking systems of the kind set forth the memory pressure is utilised to control operation of an additional pressure regulator or re-application valve which, in turn, is operative to control either directly, or indirectly by manipulation of the control valve means, the re-application of the operating fluid from the supply, at the two successive rates.

According to our invention in an anti-skid braking system of the kind set forth for a vehicle the memory pressure is utilised to determine the magnitude of a force for operating the control valve means itself during the first and second successive stages of brake re-application.

Since no additional pressure regulator or re-application valve is required the construction is simplified which, in turn, has the advantage of increasing reliability due to the elimination of a number of components, for example seals, pistons and diaphragms, which are liable to fail in service.

To increase the pressure at the reduced rate during the second stage the memory pressure is itself increased gradually by the application thereto of a higher pressure from the supply, through a suitable restrictor.

Preferably the memory chamber is defined between a pair of spaced pistons which work in a common bore in a housing and are coupled by a lost-motion connection.

In one construction the pistons are urged away from each other by means of a spring, a first one of the pistons is exposed to an operator-controlled pressure, the other second piston is exposed to the operating fluid, and a latch valve is incorporated through which the operator-controlled pressure is supplied to the memory chamber until the skid point is reached at which the latch valve closes and remains shut during brake re-application in a common cycle so that the memory pressure can only be increased by the operating fluid entering the memory chamber through the restrictor which is located in the second piston.

Conveniently the second piston controls the valve means directly. During normal operation and before the skid point is reached, both pistons move in unison in response to the operator-controlled pressure, suitably a pedal-operated air treadle valve. However, upon brake re-application with the latch valve closed, the operation of the valve means is controlled by relative movement of the two pistons and the loading of the spring. Specifically during the first stage, the first piston moves towards the second to increase, by compression, the memory pressure in the memory chamber which acts to cause the second piston to operate the valve means and allow the operating pressure to be supplied to the brakes. The movement of the first piston with respect to the second is limited by the provision of a stop and, when the operating pressure exceeds the memory pressure by the amount greater than the force in the spring, the second piston moves towards the first to close the valve means. The valve means remains closed until the memory pressure is increased through the restrictor to a value such that the spring is operative to re-open the valve means and the operating pressure, in turn, can increase sufficiently to repeat the sequence described above.

Conveniently the control valve means, the deceleration responsive means, the latch valve and the restrictor are all incorporated in a common housing of a single unit provided with suitable connections to the treadle valve, the supply of operating fluid, and the brakes. This has the advantage that the unit can be incorporated in existing pneumatically-operated braking systems with a minimum of adaption.

One embodiment of our invention is illustrated in the accompanying drawings in which.

Figure 1:
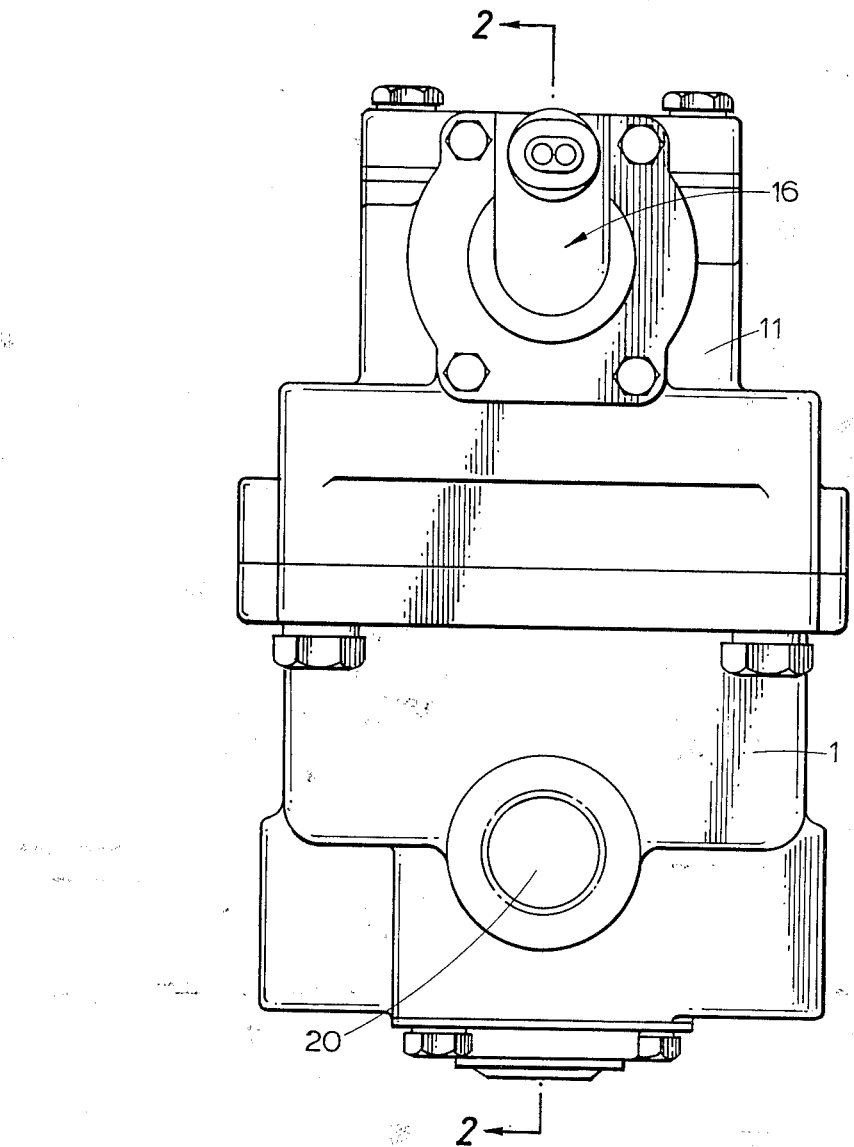
FIG. 1 is a side elevation of a skid control unit for a pneumatically-operable braking system.
Figure 2:
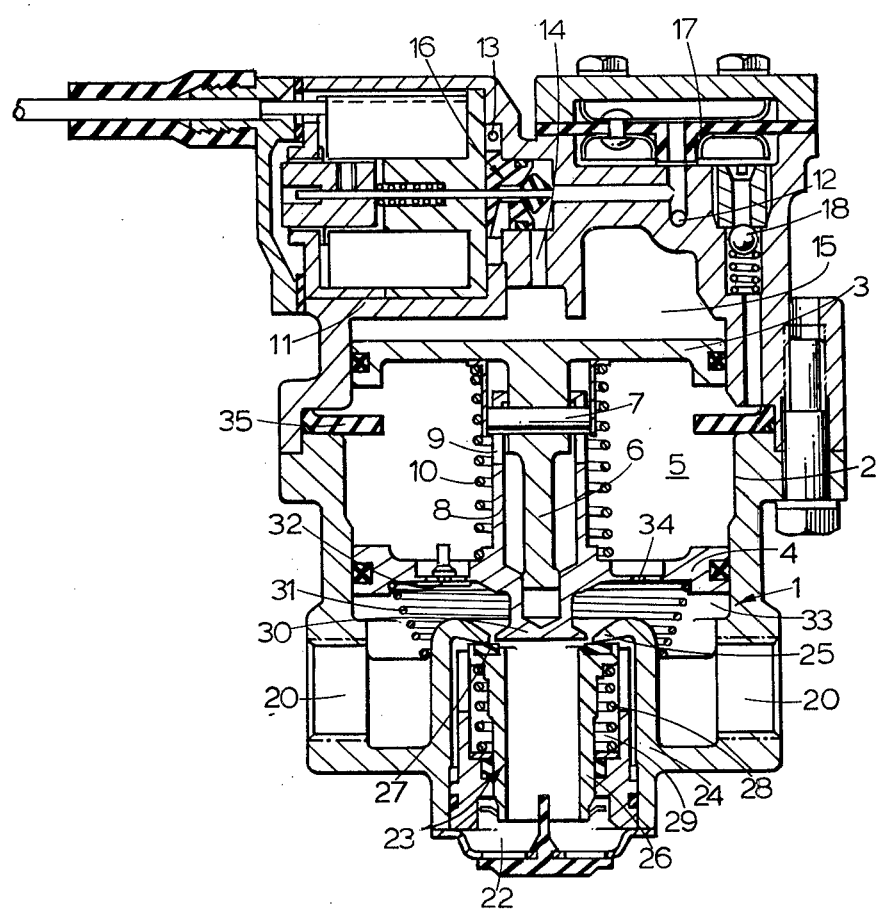
FIG. 2 is a transverse section on the line 2—2 of FIG. 1.
Figure 3:
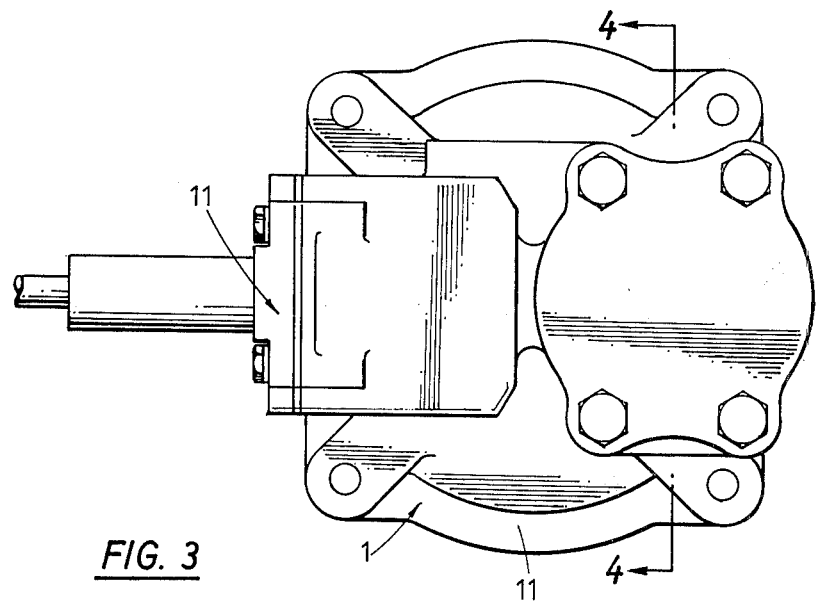
FIG. 3 is a plan view of the unit.
Figure 4:
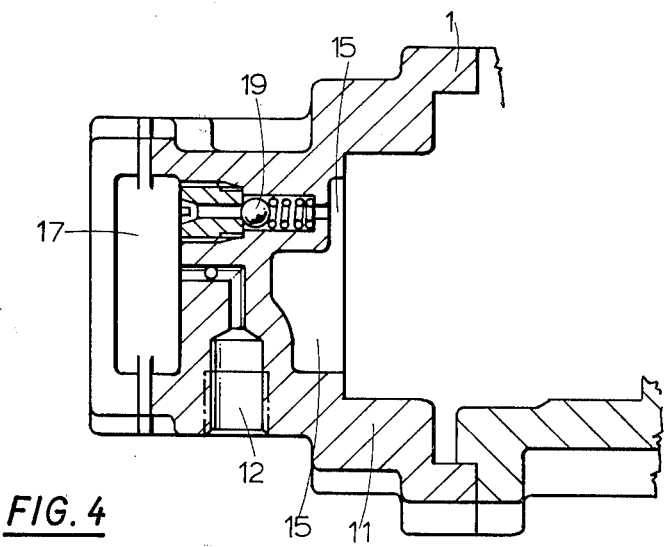
FIG. 4 is a section on the line 4—4 of FIG. 3.
Figure 5:
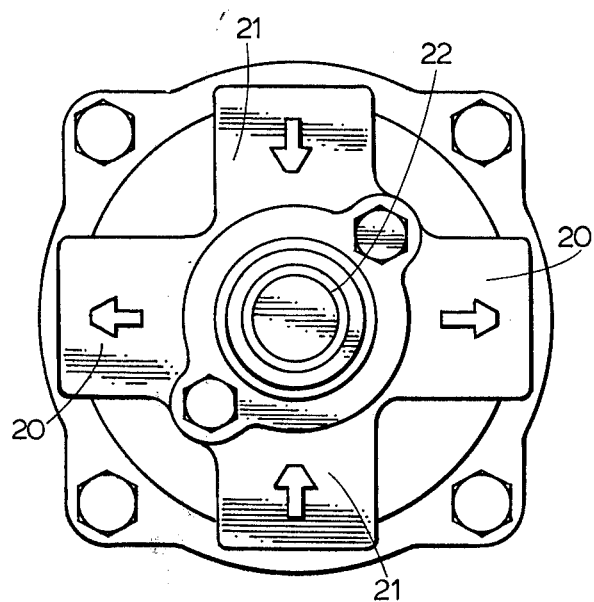
FIG. 5 is an inverted plan view.

The unit illustrated in the drawings comprises a housing 1 having a bore 2 in which works a first upper piston 3 and a second power piston 4. A memory chamber 5 is defined in the bore between the pistons 3 and 4. The pistons 3 and 4 are coupled by a lost-motion connection comprising a depending stem 6 on the first piston 3 which carries a transverse pin 7, and an upwardly directed cylindrical extension 8 on the lower piston 4 which is provided with diametrically opposed axial slots 9 in which opposite ends of the pin 7 are slidably received. A compression spring 10 acts between the pistons 3 and 4 to urge them away from each other.

The upper end of the housing 1 is closed by an end closure 11 in which is incorporated an inlet passage 12 for connection to a pedal-operated treadle valve, an exhaust port 13, a passage 14 leading into an application chamber 15 above the piston 3, a solenoid-operated valve 16 responsive to deceleration of a wheel for controlling communication between the passages 12 and 14 and between the passage 14 and the port 13, a latch valve 17 for controlling communication between the inlet passage 12 and the memory chamber 5 and having a metered orifice providing restricted communication between its opposite sides, a one-way valve 18 between the latch valve 17 and the memory chamber 5, and a one-way valve 19 between the latch valve 17 and the chamber 15.

The lower end of the housing 1 is provided with a pair of diametrically opposed ports 20 for connection to actuators of wheel brakes, a pair of diametrically opposed ports 21 for connection to a supply of pneumatic pressure, and an exhaust port 22.

Communication between the ports 20 and 21, and between the ports 21 and 22 is controlled by valve means 23. The valve means 23 comprise a cylindrical wall 24 integral with the housing 1 and provided at its inner end with a radial seating 25 and at its outer lower end with the exhaust port 22. A cylindrical valve member 26 is guided to slide in the wall 24 and at its upper end has a seal head 27 normally urged into engagement with the seating 25 by means of a compression spring 28. A chamber 29 between the valve member 26 and the wall 24 comprises the inner ends of the supply ports 20. The piston 4 is provided with a depending valve head 30 for engagement with the seal head 27, and a spring 31 acts on the piston 4 to urge the head 30 away from the head 27.

In an inoperative position shown in the drawings, the head 27 engages with the seating 25 to cut-off communication between the ports 20 and the ports 21 through the chamber 29, and the head 30 is spaced from the seal head 27 so that the outlet ports 20 are exhausted to atmosphere through the exhaust port 22.

A one-way valve 32 permits flow from the memory chamber 5 into a space 33 below the piston 4 and which comprises the inner end of the outlet ports 20, and a metered orifice 34 permits flow in both, but for practical purposes the opposite, direction.

The pistons 3 and 4 can move in unison towards the lower end of the housing 1 through a limited distance until the piston 3 engages with an annular stop 35 in the housing 1.

Figure 6:
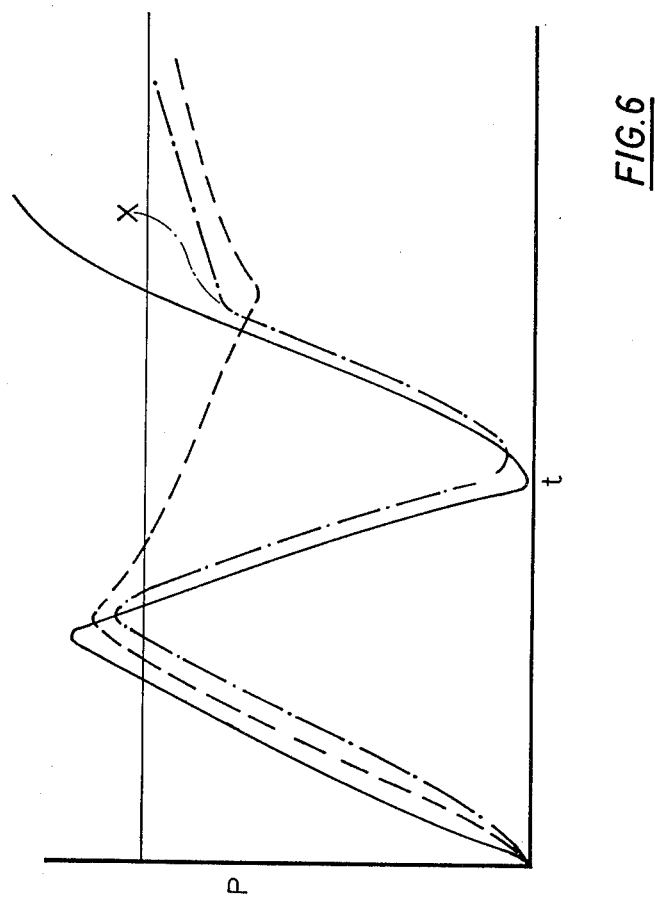
FIG. 6 is a graph showing the pressure operative in the system during a braking cycle.

In operation, with the solenoid de-energised, the solenoid valve 16 closes the exhaust port 13 from the interior of the unit so that, when the treadle valve is operated, actuating pressure is supplied from the inlet port 12 into the application chamber 15 above the piston 3 through the passage 14, through the latch valve 17 and the one-way valve 18 into the memory chamber 5, and through the latch valve 17 and the one-way valve 19 into the chamber 15. The pistons 3 and 4 are advanced in unison with the head 30 first engaging with the seal head 27 to isolate the exhaust port 22 from the outlet ports 20. Thereafter the head 30 moves the head 27 away from the seating 25 so that pressure fluid is applied to the brake actuators from the outlet ports 20. Thus, the pressures in the chambers 15 and 5, and the brake pressure, all rise as shown in the graph of FIG. 6 in which pressure (P) is plotted against time (t). The pressure in the application chamber 15 is shown in full lines, the pressure in the memory chamber 5 is shown in broken lines (– – –), and the pressure of the outlet ports 20 is shown in phantom lines (–·–·–).

Should the wheel deceleration become excessive and skid develop, the solenoid is energised and operates the valve 16 to cut-off communication between the port 12 and the chamber 15 through the passage 14, and exhaust the chamber 15 to atmosphere through the passage 14 and the port 13. This reduction in pressure permits both pistons 3 and 4 to rise. The seal head 27 first engages with the seating 25 to cut-off pressure to the brake actuators, and the head 30 subsequently moves away from the head 27 to exhaust the brake actuators to atmosphere through the exhaust ports 22. At the skid point indicated in the graph by the horizontal line parallel to the time (t) axis there is therefore a sudden drop in the pressure in the chamber 15 which causes the latch valve 17 to close, and there is also a sudden drop in the brake pressure at the outlet ports 20. Because of closure of the latch valve 17 and the provision of the one-way valves 18 and 19, fluid pressure at the applying pressure is trapped in the memory chamber 5. This pressure will decay gradually as shown into the space 33 below the piston 4, but at a rate controlled by the metered orifice 34.

When the skid has been corrected, the solenoid is de-energised and the solenoid-operated valve 16 returns to the position shown in the drawings so that pressure fluid is again supplied to the application chamber 15 but only through the passage 14 since the latch valve 17 is still closed. This causes both pistons to operate substantially as described above with the head 30 initially isolating the ports 20 from the exhaust port 22, and thereafter supplying pressure fluid to the actuators through the ports 20.

Since the pressure in the memory chamber 5 is lower than that of the application chamber 15, fluid in the memory chamber 5 will be compressed with the piston 3 moving through a greater distance than, and with respect to, the piston 4 against the force in the spring 10. This is permitted by the lost-motion connection and can continue at least until movement of the piston 3 is arrested by the stop 35.

As the brakes are re-applied the pressure acting on the underside of the piston 4 increases rapidly and when it exceeds a value equal to the pressure in the memory chamber 5 plus the force in the spring 10, the piston 4 moves towards the piston 3 to permit the head 27 to re-engage with the seating 25 at the changeover point X. This prevents further increase in the pressure applied to the brake actuators. That higher pressure bleeds into the memory chamber 5 through the restrictor 34 to increase the pressure in the memory chamber 5 and, when the pressure on opposite sides of the piston 4 are substantially equal, the spring 10 reacts on the piston 4 to urge the head 27 away from the seating 25. Thus, the pressure applied to the brakes can increase, but at a lower rate of pressure increase as shown in FIG. 6. Again, when the increased brake pressure exceeds the pressure in the memory chamber 5 plus the force in the spring 10, the valve head 30 will again permit the valve head 27 to seat against the seating 25 to prevent any further brake pressure increase, until the pressures on opposite sides of the piston 4 again equalise.

At the termination of the braking cycle when the pedal of the treadle operated valve is released, all chambers are exhausted to atmosphere with the latch valve 17 opening when the pressures on both sides are equal.

I claim:

1. A fluid-pressure operated anti-skid braking system for a vehicle comprising a wheel brake, a supply of operating fluid for actuating said brake, fluid-flow control means interposed between said supply and a connection to said brake and through which said operating fluid is supplied to said brake, means responsive to a skid signal for operating said valve means to relieve the brake pressure of said fluid supplied to said wheel brake at a skid point when the skid signal exceeds a predetermined value, a housing, and means in said housing defining a memory chamber for storing a memory pressure dependant upon a brake pressure occurring at said skid point to provide a changeover point between first and second stages of brake re-application, said first stage comprising the re-application of said operating fluid from said supply until an intermediate pressure less than the pressure at said skid point is attained at the changeover point, and said second stage comprising the continued re-application of said supply of operating fluid at a reduced rate of pressure increase, wherein said memory pressure is utilised to determine the magnitude of a force for operating said control valve means itself during said first and second successive stages of brake re-application, and wherein a movable wall in said housing defines at least a part of said memory chamber and is operatively connected to said valve means, said movable wall having a first side which is exposed at all times to pressure in said memory chamber and a second opposite side which is exposed to said connection to said brake.

2. A braking system as claimed in claim 1, wherein said housing has a bore, and said movable wall comprises one of a pair of pistons which work in said bore with a space between said pistons defining said memory chamber, a lost-motion connection coupling said pistons.

3. A fluid-pressure operated anti-skid braking system for a vehicle comprising a wheel brake, a supply of operating fluid for actuating said brake, fluid-flow control means interposed between said supply and said brake and through which said operating fluid is supplied to said brake, means responsive to a skid signal for operating said valve means to relieve the brake pressure of said fluid supplied to said wheel brake at a skid point when the skid signal exceeds a predetermined value, a housing have a bore, a pair of pistons working in said bore with a space between said pistons defining a memory chamber for storing a memory pressure dependant upon the brake pressure occurring at said skid point to provide a changeover point between first and second stages of brake re-application, and a lost-motion connection between said pistons, said first stage comprising the re-application of said operating fluid from said supply until an intermediate pressure less than the pressure at said skid point is attained at the changeover point, and said second stage comprising the continued re-application of said supply of operating fluid at a reduced rate of pressure increase, wherein said memory pressure is utilised to determine the magnitude of a force for operating said control valve means itself during said first and second successive stages of brake re-application, and wherein a spring is provided for urging said pistons away from each other, a first one of the pistons is exposed to an operator-controlled pressure, the second piston is exposed to said operating fluid, a latch valve is incorporated through which an operator-controlled pressure is supplied to said memory chamber until said skid point is reached at which said latch valve closes and remains shut during brake re-application in a common cycle, and a restrictor passage is provided through which said memory pressure in said memory chamber can only be increased by the operating fluid when said latch valve is closed.

4. A braking system as claimed in claim 3, wherein said restrictor is provided in said second piston.

5. A braking system as claimed in claim 3, incorporating a stop for limiting movement of said first piston towards said second piston against the loading in said spring.

6. A braking system as claimed in claim 3, wherein said housing is provided with an inlet port, an outlet port, and said valve means comprises a relatively stationary seating in said housing, a valve member engageable with said seating to isolate said inlet port which is connected to said operating fluid from said outlet port which is connected to said wheel brake, a spring for urging said valve member into engagement with said seating, and a head on said second piston which is movable between an inoperative position in which it is spaced from said valve member so that said outlet port can communicate with said exhaust port to atmosphere and an operative position in which it is moved towards said seating initially to cause said head to engage with said valve member to isolate said outlet port from said exhaust port and subsequently to urge said valve member away from said seating to place said inlet port in communication with said outlet port.

7. A braking system as claimed in claim 3, wherein said control valve means, said means responsive to said skid signal, said latch valve, and said restrictor are all incorporated in said housing.

* * * * *